Feb. 21, 1961 F. L. DAVIS 2,972,398
AUTOMOBILE FAN DRIVE
Filed May 2, 1957 2 Sheets-Sheet 2

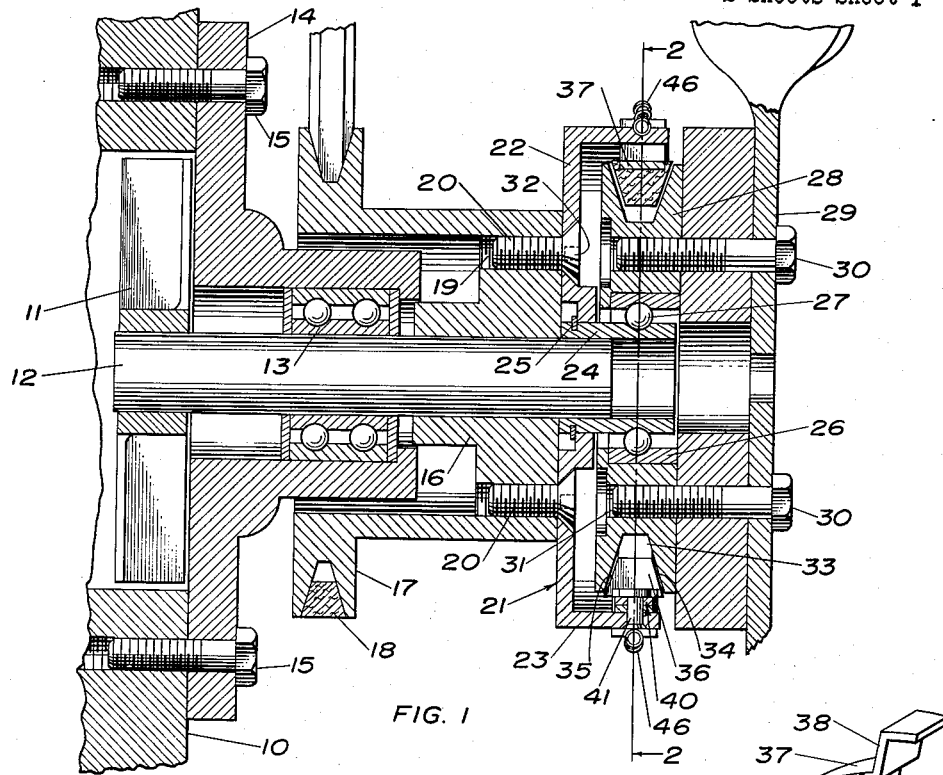

INVENTOR.
FREDERICK L. DAVIS
BY
ATTORNEYS

United States Patent Office

2,972,398
Patented Feb. 21, 1961

2,972,398
AUTOMOBILE FAN DRIVE

Frederick L. Davis, Fort Worth, Tex., assignor to Welex, Inc., Fort Worth, Tex., a corporation of Delaware Filed May 2, 1957, Ser. No. 656,562

7 Claims. (Cl. 192—103)

This invention relates to an automobile fan drive and more particularly to a clutch that automatically engages and disengages the fan of an automobile engine in response to the combined effects of engine speed and temperature.

It is known that the cooling fan of an automobile engine is not required at high vehicle speeds at which ram air is sufficient for cooling purposes. It has also been appreciated that a substantial amount of power is required to drive the cooling fan, especially at high speeds. Engine cooling fans have been equipped with temperature responsive clutches that serve to disengage the fan from driving relation with the vehicle engine when the engine is running cool and to connect the fan to the engine when the engine is running hot. Engine cooling fans have also been equipped with centrifugally actuated clutches that serve to disengage the fan at high engine speeds and to re-engage the fan at low engine speeds.

Temperature responsive fan clutches or centrifugally actuated fan clutches are advantageous in that they assist in conserving engine power while maintaining a certain degree of control of engine temperature. However, neither type of clutch is capable of effecting maximum power and fuel savings with close control of engine temperature.

With the foregoing in view, it is an object of the present invention to provide a clutch especially suitable for driving the fan of an automobile engine.

Another object is to provide a clutch of this kind that may readily be installed in existing automobile engines.

Another object of the invention is to provide an automobile fan clutch that is entirely automatic in operation and yet is of simple construction and inexpensive to manufacture.

Another object of the invention is to provide an automobile fan clutch that is disengaged when the engine is first started and is cold, that engages when the engine has reached a predetermined temperature and is running at reasonably low speeds, that becomes disengaged at the normal operating temperature when the engine is running at high speeds, and that finally becomes re-engaged even at high operating speeds when engine temperature rises above a safe operating level.

These and other objects of the invention as may appear hereinafter are realized in a clutch including a rotary driven member having a clutch surface, a rotary driving member, a clutch shoe carried by the driving member, the shoe being mounted for movement between a disengaged position and an engaged position in which it drivingly engages the clutch surface. The clutch shoe is urged to disengaged position by centrifugal force. Temperature responsive means is provided for urging the clutch shoe to the engaged position in opposition to the action of centrifugal force.

The temperature responsive means is preferably a resilient bi-metallic strip carried by the driving clutch member and is adapted, with rising temperature, progressively to urge the clutch shoe toward and into the engaged position against the action of centrifugal force. Centrifugal force acts in opposition to the movement of the clutch shoe by the bi-metallic member and overcomes the latter at higher speeds of rotation of the clutch.

As described more fully hereinafter, the rotary driving member has a flange that surrounds the clutch surface of the driven member and both the clutch shoe and the bimetallic, temperature responsive strip are mounted on the flange. Preferably, the strip is in good heat conducting contact with the flange.

The clutch may be of the self-energizing type wherein, after initial engagement of the clutch shoe with the clutch surface, the pull on the clutch shoe by the driving member serves more firmly to engage the clutch shoe and cooperating clutch surface.

The invention will be described with greater particularity with reference to the accompanying drawings in which:

Fig. 1 is an axial sectional view through the fan drive of an automobile engine showing one form of automatic clutch in accordance with the invention, the view being taken along the line 1—1 of Fig. 2;

Fig. 2 is a transverse sectional view taken along the line 2—2 of Fig. 1 through the clutch of the invention;

Fig. 3 is an isometric view showing the clutch shoe assembly and bi-metallic strip member removed from the clutch of Figs. 1 and 2;

Figure 4:
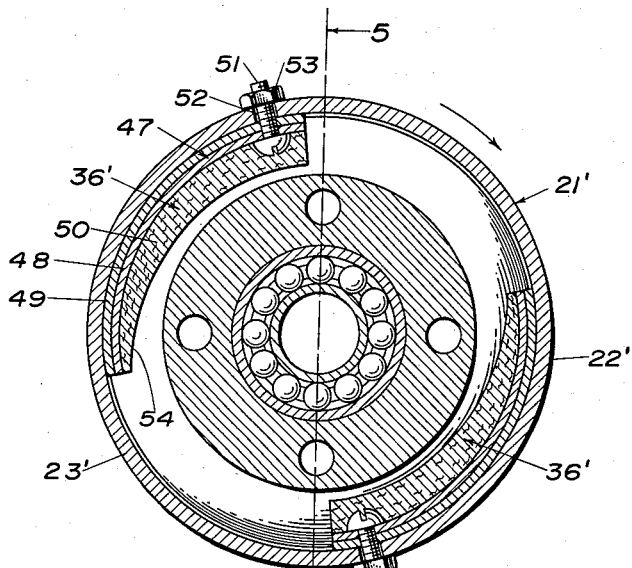
Fig. 4 is a transverse sectional view taken along the line 4—4 of Fig. 5 of another form of clutch in accordance with the invention.

Referring to the drawings, particularly to Figs. 1 through 3, there is shown in Fig. 1 a fragmentary view of the front end of an automobile engine having a cylinder block 10 including a water pump having an impeller 11 carried and driven by a water pump shaft 12. The shaft is journaled in a bearing 13 mounted in a water pump cover 14 secured by bolts 15 to the cylinder block 10. A fan hub 16 is fixed to the shaft 12 and is provided with an integral sheave 17 driven in conventional manner by the engine through a belt 18. Threaded holes 19 in the front of the fan hub receive screws 20 which mount in the clutch unit 21 to the fan hub.

The clutch unit has a housing member 22 having a longitudinally extending peripheral flange 23. The housing is supported on a central sleeve 24 to which the housing is secured by a lock ring 25. The sleeve 24 serves as the inner race of a ball bearing assembly having an outer race 26 and bearings 27 supporting the outer race for rotation on the sleeve 24. The outer race 26 carries a clutch sheave 28 to which the fan blade assembly 29 is attached by bolts 30 threaded into holes 31 in the clutch sheave 28.

From the description thus far, it will be seen that the housing 22 is driven by and rotates with the fan hub 16 and that, unless otherwise impelled, the clutch sheave 28 and fan blade assembly 29 may idle on the ball bearings 27 independently of the clutch housing.

The clutch sheave 28 has a V-shaped groove 33 formed around its periphery. The side walls of the groove provide clutch surfaces 34 adapted to be engaged by the complementary surfaces 35 of the clutch shoes 36.

Each clutch shoe has an arcuate back member or support 37 formed of a metal strip or other suitable material. One end of the support is bent to form a Z-shaped terminal 38. The upstanding portion of the Z-shaped terminal is received in a slot 39 in the housing flange 23 with the outer end of the terminal overlying the flange.

A body of friction material is bonded to the support 37 and provides the friction surfaces 35 of the clutch shoe.

A temperature responsive element 40 is secured along the inner periphery of the flange 23 by a rivet 41 extending through a hole 41a in one end of the element. The temperature responsive element is of the well-known bi-metallic type of which the inner lamination 42 may be of Invar and the outer lamination 43 may be of brass, for example, welded to the inner lamination. Owing to the properties of the temperature responsive element 40, wherein the outer lamination has a greater thermal co-efficient of expansion than the inner lamination, the free end 44 of the element will curl progressively radially inwardly as the temperature of the element 40 is increased.

As best seen in Fig. 2, the free end 44 of the temperature responsive element overlies the free end 45 of the clutch shoe 36 and, as the temperature responsive element moves inwardly, it moves the clutch shoe radially inwardly to engage the shoe with the sides of the groove 33 in the sheave 28. The housing 22 is driven in a clockwise direction as indicated by the arrow. When the clutch shoe is moved into engagement with the groove of the sheave 28, the clutch shoe 36 tends to wrap around the sheave and to become tightly engaged in the groove. Therefore, very little pressure is required on the free end 45 of the shoe to establish and maintain firm clutching engagement. It will be seen that the clutch is thus self-energized.

A ring-shaped spring 46, or alternatively a rubber or neoprene O-ring or the like, may be tensioned around the flange 23 to overlie the outer ends of the clutch shoe terminals 38. Inward pressure exerted by the spring on the terminal ends fulcrums the clutch shoes 36 to disengaged position. The force of the spring 46 is but slightly more than sufficient to maintain the shoes disengaged when the clutch is at rest. A circumferential groove may be provided in the outer surface of the flange 23 to receive the spring 46 and thus retain the latter on the flange.

It will be seen that when the housing 22 is rotated, as it is when the engine is running, centrifugal force tends to throw the clutch shoes 36 radially outwardly and out of clutching engagement with the sheave 28. It will be understood that the force acting on the shoes increases with rotational speed of the housing.

In operation, let it be assumed that the automobile engine is started from a cold condition. The force of spring 46 and centrifugal force acting on the shoes swing the shoes out of engagement with the groove 33. The clutch is thus disengaged and the fan is not driven, it being free to idle on the bearings 27.

As the engine warms up, which it does the more quickly because the cooling fan is idle, the temperature of the bi-metallic member 40 also rises and the free end 44 thereof curls radially inwardly to move the clutch shoe toward engagement with the clutch sheave. At a preselected temperature for which the clutch is designed, corresponding to a temperature somewhat above a safe engine operating temperature, movement of the bi-metallic member will effect engagement of the clutch shoes with the clutch sheave. When this occurs, the fan 29 is connected through the clutch unit to the fan hub 16 and is directly driven thereby.

At normal engine speeds and temperatures, the fan will be automatically driven and disengaged in accordance with temperature changes of the engine. If the engine should become too hot, the clutch will become engaged to drive the fan and cool the engine to a safe operating temperature whereupon the clutch will become automatically disengaged. At high engine speeds, centrifugal force will overcome the force of the bi-metallic member 40 and the clutch will remain disengaged as long as engine temperatures are normal. Under these conditions, sufficient cooling air is provided by movement of the vehicle.

Even at high speeds, if the engine should overheat, the bi-metallic member 40 will effect re-engagement of the clutch and the fan will be driven to cool the engine to a safe operating temperature.

Placement of the temperature responsive element 40 in contact with the inner periphery of the housing flange 23 enables the element rapidly to sense and respond to changes in engine temperature. Good heat conduction is afforded with the cylinder block and cooling system through the metallic train consisting of the flange 23, the housing member 22, the sleeve 24 and the water pump shaft 12. Moreover, heat from the automobile radiator is quickly conducted to the temperature responsive element by the air stream flowing through the radiator and over the clutch unit; heat from this source quickly reaches the element 40, principally through the metallic flange 23.

From the foregoing description it will be apparent that the clutch unit of the invention operates in accordance with the dynamic balance achieved between centrifugal force acting on the clutch shoes and also on the bi-metallic strip members, which force urges the clutch shoes outwardly, and the radially inward force applied to the clutch shoes by the bi-metallic strip members in accordance with temperature. It is to be noted that the bi-metallic strip members, when they are curled inwardly away from the flange 23, have the properties of centilever springs resiliently opposing outward movement of the clutch shoes.

In one clutch unit, constructed in accordance with Figs. 1 to 3, installed in an automobile engine, the unit was designed so that with the automobile driven at a speed of 30 m.p.h. in high gear, the fan remained disengaged until the water in the cooling system reached a temperature of 170° F. At this temperature, the clutch operated to drive the fan. The fan continued to be driven until the speed of the automobile was increased to 40 m.p.h. at which speed centrifugal force caused the clutch to become disengaged allowing the fan to "windmill." The automobile's speed was increased up to 80 m.p.h. without re-engagement of the clutch and without the engine becoming overheated.

The clutch unit 21 is a self-contained assembly that may easily be installed in a conventional automobile. In a conventional automobile, the fan blade assembly 29 is fastened directly to the fan hub 16 by the bolts 30. To install the clutch unit, the fan blade assembly 29 and bolts 30 are removed from the hub. The unit is then attached to the hub by turning the screws 20 of the unit into the threaded holes 19 of the hub. The screws 20 have hexagonal Allen sockets 32 formed in their heads. These sockets are readily accessible through bolt holes 31 in the clutch sheave for insertion of an Allen wrench therein for tightening the screws 20. After the unit is attached to the hub, the fan blade assembly 29 is secured to the sheave 28 using the fan bolts 30.

Figure 5:
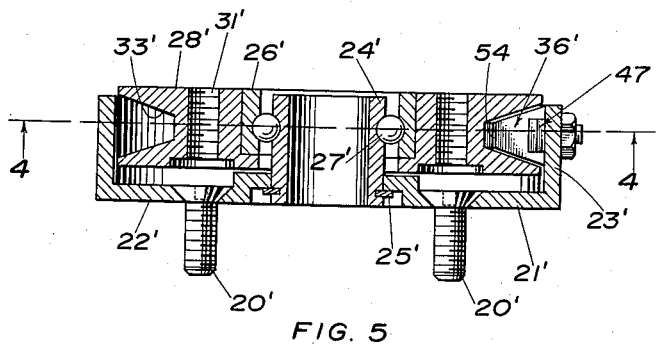
Fig. 5 is an axial sectional view taken along the line 5—5 of Fig. 4.

Another form of the clutch unit of the invention is shown in Figs. 4 and 5, to which reference is now made. In Figs. 4 and 5, parts that are similar to corresponding parts of the clutch unit of Figs. 1 through 3 are designated by similar but primed reference numerals.

The clutch unit of Figs. 4 and 5 is similar in construction and operation to that described hereinbefore. The important difference between the clutch unit of Figs. 4 and 5 and the clutch unit of Figs. 1 to 3 is that in the clutch unit of Figs. 4 and 5 the temperature responsive element forms an integral part of the clutch shoe serving as the back member or support of the clutch shoe.

In Figs. 4 and 5, the clutch unit is designated generally by the reference numeral 21'. The unit has a housing member 22' including a peripheral flange 23'. The housing is provided with mounting screws 20' for securing the unit to the fan hub of an automobile engine. A sleeve 24' is adapted to receive the water pump shaft and the sleeve is retained in the housing by a lock ring 25'. The sleeve functions as the inner race of a ball bearing assembly having an outer race 26' supported thereon by ball bearings 27'. The outer race 26' carries a clutch sheave 28' provided with threaded holes 31' receiving bolts by which the fan blade assembly is mounted on the unit. A peripheral V-shaped clutch groove 33' is provided in the clutch sheave.

The clutch shoes are designated by the general reference numeral 36'. Each shoe has an arcuate bi-metallic temperature responsive element 47, including an inner lamination 48 and an outer lamination 49 having a greater thermal coefficient of expansion than the inner lamination. Bonded to the element 47 is a body of friction material 50 providing the friction surfaces of the clutch shoe. Imbedded within the body of friction material and extending outwardly through a hole in one end of the element 40 is a mounting screw 51. In assembling the shoes to the housing, the mounting screws 51 are inserted through holes 52 in the flange and the shoes are secured in position by nuts 53 which lock the assemblies in place.

It will be observed that the clutch shoe 36', as well as the clutch shoe 36 of the first described form of the invention, is tapered in a direction opposite to the direction of rotation of the driving clutch member. That is to say, the radially inward face 54 of the clutch shoe is curved outwardly from the center of the clutch unit in a direction opposite to the direction of rotation. Of course, the sides of the clutch shoe are formed with a uniform angle throughout the length of the clutch shoe in order to engage the sides of the clutch groove at all points. This tapering configuration has been found to produce a smoother clutching action and to prevent grabbing on engagement of the clutch shoe.

In operation, the clutch unit of Figs. 4 and 5 functions similarly to the unit first described herein. Upon an increase in temperature of the temperature responsive element 47, its radius is shortened and the free end thereof curls inwardly. The body of friction material 50 is sufficiently flexible to bend with the temperature responsive element. When the temperature has risen to a preselected point, engagement of the clutch shoe 36' with the groove 33' of the clutch sheave is effected to provide a driving engagement between the clutch housing and clutch sheave.

It will be understood that the clutch shoe 36', when in an inwardly flexed condition, is subject to centrifugal force engendered by rotation of the clutch unit. When centrifugal force is sufficient to overcome the temperature effect, the clutch shoe 36' will be moved out of clutching engagement with the sheave 28'. Thus, it will be seen that the clutch of Figs. 4 and 5 functions in much the same way as the clutch of Figs. 1 through 3.

The clutches of the present invention are positive in action and there is no damaging slippage between the clutch shoes and the clutch sheave. Because of the self-energizing action of the clutch shoes, as described hereinbefore, engagement is positive. When centrifugal force overcomes the forces tending to engage the clutch, release of the shoes is substantially instantaneous and, owing to centrifugal force, the shoe is held in a completely disengaged position where it cannot rub against the groove in the clutch sheave. Thus, the clutch unit of the present invention has an extremely long service life.

It is apparent that the present invention provides a very simple automatic clutch mechanism for driving an automobile fan or the like that effectively controls engine temperature while drawing a minimum amount of power from the automobile engine. The clutch unit effects substantial fuel savings in the operation of an automobile on which it is installed and increases the power available to drive the vehicle. Moreover, when the fan is disengaged, objectionable fan noise is eliminated; the advantages in this regard are most noticeable at high driving speeds.

I claim:
1. A clutch of the kind indicated comprising: a rotary driven member having a peripheral clutch surface; a coaxial rotary driving member having a flange surrounding the clutch surface of said driven member; an arcuate clutch shoe; means mounting said clutch shoe on the flange of said driving member for movement between a normally disengaged position and an engaged position in which said clutch shoe drivingly engages said clutch surface; a bi-metallic, temperature responsive strip; and means mounting said strip on said flange, said strip being mounted on said flange at one end only of said strip and extending arcuately in contact with a substantial portion of the inner periphery of said flange in good heat conducting contact therewith and curling inwardly when heated, for urging said shoe into said engaged position; said shoe being urged to said disengaged position by centrifugal force.

2. A clutch of the kind indicated comprising: a rotary driven member having a peripheral clutch groove therein; a coaxial rotary driving member having a flange surrounding the clutch groove of said driven member; an arcuate clutch shoe; means mounting said clutch shoe on the flange of said driving member adjacent the inner periphery of said flange for swinging movement between a normally disengaged position and an engaged position in which said clutch shoe drivingly engages a clutch surface of said groove; an arcuate, bi-metallic, temperature responsive strip; and means mounting said strip on said flange, said strip being mounted on said flange at one end only of said strip and extending arcuately in contact with a substantial portion of the inner periphery of said flange in good heat conducting contact therewith with the free end of said strip movable radially inwardly of said flange with increasing temperature to engage the free end of said clutch shoe, for urging said shoe to swing into said engaged position; said shoe being urged to said disengaged position by centrifugal force.

3. A clutch of the kind indicated comprising: a rotary driven member having a peripheral clutch surface; a coaxial rotary driving member having a flange surrounding the clutch surface of said driven member; an arcuate clutch shoe having a bi-metallic temperature responsive support member and a body of flexible friction material bonded to said support member; and means mounting said clutch shoe on the flange of said driving member, said shoe being mounted at one end only thereof, said support extending arcuately in contact with a substantial portion of the inner periphery of said flange in good heat conducting contact therewith, the free end of said support curling inwardly when heated, for urging the flexible friction material of said shoe from a normally disengaged position into an engaged position in which the friction material drivingly engages the clutch surface of said driven member, said clutch shoe being urged to said disengaged position by centrifugal force.

4. A clutch of the kind indicated comprising: a rotary driven member having a peripheral clutch surface; a coaxial rotary driving member having a flange surrounding the clutch surface of said driven member; an arcuate clutch shoe having a bi-metallic temperature responsive support member and a body of flexible friction material bonded to said support member, said support member extending substantially the entire length of said clutch shoe; and means mounting said clutch shoe on the flange of said driving member, said shoe being mounted at one end only thereof, said support extending arcuately in contact with a substantial portion of the inner periphery of said flange in good heat conducting contact therewith, the free end of said support curling inwardly when heated, for urging the flexible friction material of said shoe from a normally disengaged position into an engaged position in which the friction material drivingly engages the clutch surface of said driven member, said clutch shoe being urged to said disengaged position by centrifugal force.

5. A clutch of the kind indicated comprising: a rotary driven member having a peripheral clutch surface; a coaxial rotary driving member having a flange surrounding the clutch surface of said driven member; an arcuate clutch shoe; means mounting said clutch shoe on the flange of said driving member for movement between a normally disengaged position and an engaged position in which said clutch shoe drivingly engages said clutch surface; resilient means; means mounting said resilient means on said driving member for urging said clutch shoe to said disengaged position; a bi-metallic, temperature responsive strip; and means mounting said strip on said flange, said strip being mounted on said flange at one end only of said strip and extending arcuately in contact with a substantial portion of the inner periphery of said flange in good heat conducting contact therewith and curling inwardly when heated, for urging said shoe into said engaged position; said shoe being urged to said disengaged position by centrifugal force.

6. A clutch of the kind indicated comprising: a rotary driven member having a peripheral clutch groove therein; a coaxial rotary driving member having a flange surrounding the clutch groove of said driven member; an arcuate clutch shoe; means mounting said clutch shoe on the flange of said driving member adjacent the inner periphery of said flange for swinging movement between a normally disengaged position and an engaged position in which said clutch shoe drivingly engages a clutch surface of said groove; resilient means; means mounting said resilient means on said driving member for urging said clutch shoe to said disengaged position; an arcuate, bi-metallic, temperature responsive strip; and means mounting said strip on said flange, said strip being mounted on said flange at one end only of said strip and extending arcuately in contact with a substantial portion of the inner periphery of said flange in good heat conducting contact therewith with the free end of said strip movable radially inwardly of said flange with increasing temperature to engage the free end of said clutch shoe, for urging said shoe to swing into said engaged position; said shoe being urged to said disengaged position by centrifugal force.

7. A clutch of the kind indicated comprising: a rotary driven member having a peripheral clutch surface; a coaxial rotary driving member having a flange surrounding the clutch surface of said driven member; an arcuate clutch shoe; means mounting said clutch shoe on the flange of said driving member for movement between a normally disengaged position and an engaged position in which said clutch shoe drivingly engages said clutch surface; a bi-metallic, temperature responsive strip; and means mounting said strip on said flange for urging said shoe into said engaged position; said shoe being urged to said disengaged position by centrifugal force.

References Cited in the file of this patent

UNITED STATES PATENTS

| | | |
|---|---|---|
| 1,872,986 | Lane | Aug. 23, 1932 |
| 2,021,413 | Gille | Nov. 19, 1935 |
| 2,052,961 | Bonham | Sept. 1, 1936 |
| 2,657,852 | Spase | Nov. 3, 1953 |
| 2,762,482 | Davis | Sept. 11, 1956 |

FOREIGN PATENTS

| | | |
|---|---|---|
| 163,079 | Switzerland | Oct. 2, 1933 |